(12) United States Patent
Maki

(10) Patent No.: US 11,781,880 B2
(45) Date of Patent: Oct. 10, 2023

(54) PROCESSING DEVICE, PROCESSING METHOD, AND NON-TRANSITORY COMPUTER READABLE MEDIUM

(71) Applicant: JVCKENWOOD Corporation, Yokohama (JP)

(72) Inventor: Yasunori Maki, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 180 days.

(21) Appl. No.: 17/459,548

(22) Filed: Aug. 27, 2021

(65) Prior Publication Data

US 2021/0389150 A1 Dec. 16, 2021

Related U.S. Application Data

(63) Continuation of application No. PCT/JP2020/018505, filed on May 7, 2020.

(30) Foreign Application Priority Data

Jun. 10, 2019 (JP) ................................. 2019-107798

(51) Int. Cl.
*G01C 21/36* (2006.01)
*G06V 20/59* (2022.01)
*G06V 20/58* (2022.01)

(52) U.S. Cl.
CPC ....... *G01C 21/367* (2013.01); *G01C 21/3647* (2013.01); *G06V 20/584* (2022.01); *G06V 20/59* (2022.01)

(58) Field of Classification Search
CPC .. G01C 21/367; G01C 21/3647; G01C 21/20; G01C 25/005; G06V 20/584; G06V 20/59; G06V 20/56; G09B 29/00; G09B 29/10

See application file for complete search history.

(56) References Cited

FOREIGN PATENT DOCUMENTS

| JP | 2009-79992 A | 4/2009 |
|---|---|---|
| JP | 2009-85628 A | 4/2009 |
| JP | 2009-103663 A1 | 5/2009 |
| JP | 2009103663 A * | 5/2009 |
| JP | 2009-174982 A1 | 8/2009 |
| JP | 2010151759 A * | 7/2010 |
| JP | 2011-095140 A1 | 5/2011 |

OTHER PUBLICATIONS

International Search Report for PCT/JP2020/018505 dated Apr. 8, 2020, 4 pages.

* cited by examiner

*Primary Examiner* — B M M Hannan
*Assistant Examiner* — Elizabeth Rose Neleski
(74) *Attorney, Agent, or Firm* — Procopio, Cory, Hargreaves & Savitch LLP

(57) ABSTRACT

A processing device according to one aspect of the present invention includes a vibration detecting unit configured to detect a vibration of a vehicle, an orientation detecting unit configured to detect an orientation of the vehicle, a storing unit configured to store information indicating the orientation of the vehicle, a processing unit configured to set an orientation of a vehicle on a map of a navigation system based on the information indicating the orientation of the vehicle, and a power supply controlling unit configured to control power supplied to the orientation detecting unit and the storing unit based on a detection result of the vibration detecting unit and in response to an accessory power of the vehicle turned OFF.

7 Claims, 5 Drawing Sheets

PROCESSING DEVICE, PROCESSING METHOD, AND NON-TRANSITORY COMPUTER READABLE MEDIUM

CROSS REFERENCE TO RELATED APPLICATION

The present application is a ByPass Continuation of PCT/JP2020/018505 filed on May 7, 2020, which is based upon and claims the benefit from Japanese patent application No. 2019-107798 filed on Jun. 10, 2019, the disclosure of which is incorporated herein in its entirety by reference.

BACKGROUND

The present invention relates to processing devices, processing methods, and a non-transitory computer-readable recording medium. for navigation systems, an example of processing devices provided in vehicles, there exists the need for improved accuracy in the orientation of vehicles that the navigation systems display on their maps (i.e., the orientation indicating the traveling direction of the vehicles). In particular, when the orientation of a vehicle has changed while its accessory power (ACC power) is OFF—for example when the orientation of a vehicle parked in a multilevel parking garage has changed because of the rotation of a turntable, the orientation of the vehicle displayed on the map needs to be corrected promptly after the accessory power is switched from OFF to ON.

In this respect, according to the in-vehicle processing device disclosed in Japanese Unexamined Patent Application Publication No. 2009-103663, the user inputs direction correcting information for correcting the orientation of the vehicle along with certain position information of the vehicle on the map, and the orientation of the vehicle on the map is corrected based on the direction correcting information if the vehicle has come to be located on the input position information. With this configuration, even if the orientation of the vehicle has changed before the vehicle exits a multilevel parking garage, the orientation of the vehicle displayed on the map can be corrected promptly based on the direction correcting information.

SUMMARY

The in-vehicle processing device disclosed in Japanese Unexamined Patent Application Publication No. 2009-103663 requires the user to input certain position information and direction correcting information of the vehicle if the orientation of the vehicle is to change while the accessory power is OFF, and the operation of correcting the orientation of the vehicle displayed on the map is a nuisance.

A processing device according to an embodiment includes:
 a vibration detecting unit configured to detect a vibration of a vehicle;
 an orientation detecting unit configured to detect an orientation of the vehicle;
 a storing unit configured to store information indicating the orientation of the vehicle;
 a processing unit configured to set an orientation of a vehicle on a map of a navigation system based on the information indicating the orientation of the vehicle; and
 a power supply controlling unit configured to control power supplied to the orientation detecting unit and the storing unit based on a detection result of the vibration detecting unit and in response to an accessory power of the vehicle turned OFF.

A processing method according to an embodiment includes:
 a step of continuing to supply power to a vibration detecting unit configured to detect a vibration of a vehicle, when an accessory power of the vehicle is turned OFF;
 a step of, when the vibration detecting unit has detected a vibration that is no smaller than a preset first threshold while the accessory power of the vehicle is OFF, supplying power to an orientation detecting unit configured to detect an orientation of the vehicle and to a storing unit configured to store information indicating the orientation of the vehicle, detecting the orientation of the vehicle by the orientation detecting unit, and storing information indicating the detected orientation of the vehicle by the storing unit;
 a step of turning off the power supplied to the orientation detecting unit and the storing unit when the vibration detecting unit does not detect any vibration that is no smaller than the first threshold while the accessory power of the vehicle is OFF; and
 a step of setting an orientation of a vehicle on a map of a navigation system based on information indicating a latest orientation of the vehicle.

A program according to an embodiment causes a computer to execute:
 a process of continuing to supply power to a vibration detecting unit configured to detect a vibration of a vehicle, when an accessory power of the vehicle is turned OFF;
 a process of, when the vibration detecting unit has detected a vibration that is no smaller than a preset first threshold while the accessory power of the vehicle is OFF, supplying power to an orientation detecting unit configured to detect an orientation of the vehicle and to a storing unit configured to store information indicating the orientation of the vehicle, detecting the orientation of the vehicle by the orientation detecting unit, and storing information indicating the detected orientation of the vehicle by the storing unit;
 a process of turning off the power supplied to the orientation detecting unit and the storing unit when the vibration detecting unit does not detect any vibration that is no smaller than the first threshold while the accessory power of the vehicle is OFF; and
 a process of setting an orientation of a vehicle on a map of a navigation system based on information indicating a latest orientation of the vehicle.

DETAILED DESCRIPTION

Hereinafter, some specific embodiments to which the present invention has been applied will be described in detail with reference to the drawings. It is to be noted, however, that the present invention is not limited to the following embodiments. Moreover, the following description and the drawings are simplified as appropriate for the sake of providing clear description.

First Embodiment

Figure 1:
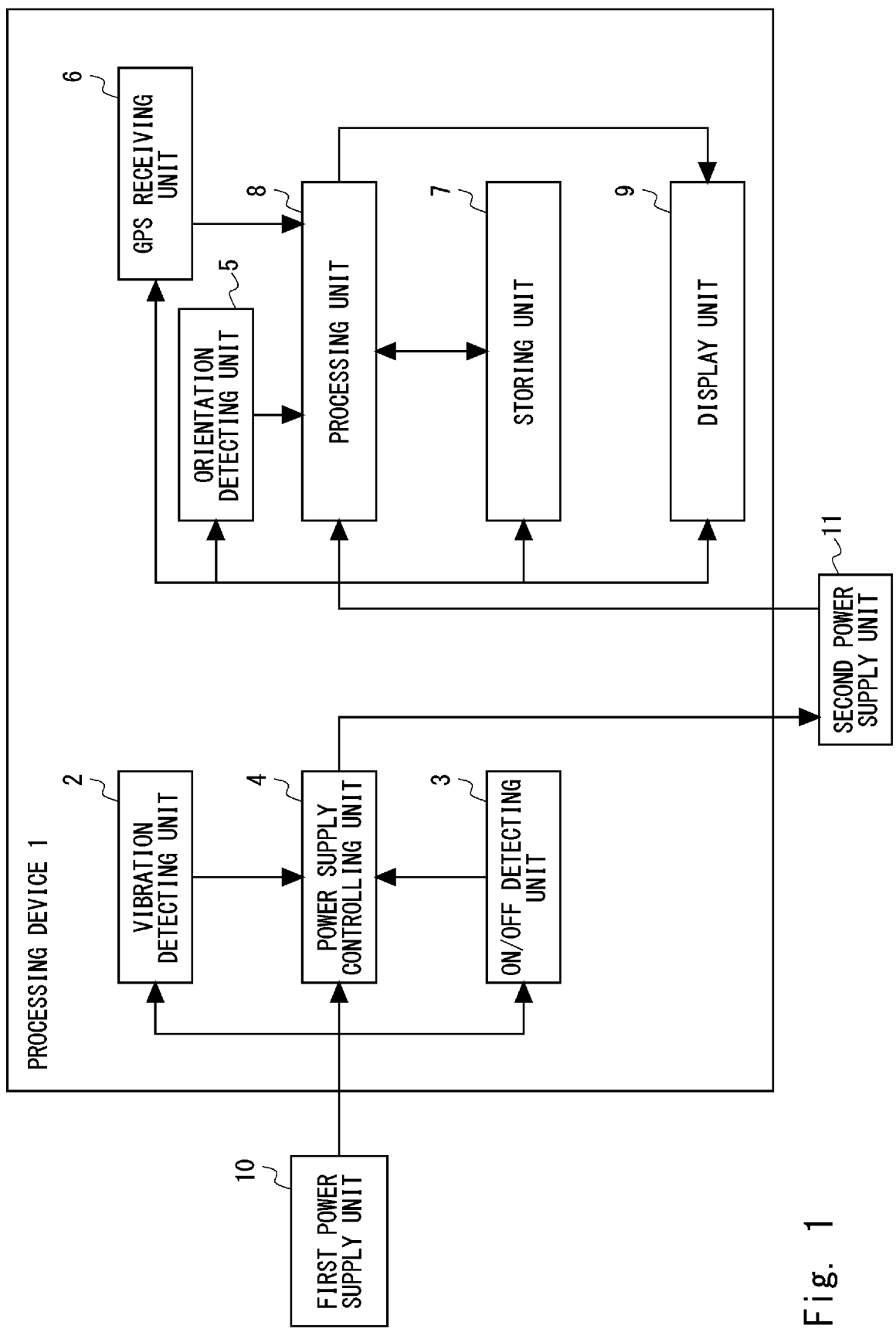
FIG. 1 is a block diagram illustrating a configuration of a processing device according to a first embodiment.

First, a configuration of a processing device according to the present embodiment will be described. FIG. 1 is a block diagram illustrating the configuration of the processing device according to the present embodiment. A processing device 1 is suitable, for example, as a navigation system to be provided in a vehicle. As illustrated in FIG. 1, the processing device 1 includes a vibration detecting unit 2, an ON/OFF detecting unit 3, a power supply controlling unit 4, an orientation detecting unit 5, a global positioning system (GPS) receiving unit 6, a storing unit 7, a processing unit 8, and a display unit 9.

The vibration detecting unit 2, the ON/OFF detecting unit 3, and the power supply controlling unit 4 operate on the power supplied from a first power supply unit 10. Meanwhile, the orientation detecting unit 5, the GPS receiving unit 6, the storing unit 7, the processing unit 8, and the display unit 9 operate on the power supplied from a second power supply unit 11. The first power supply unit 10 and the second power supply unit 11 can each be constituted by a battery provided in the vehicle, and the first power supply unit 10 may be a backup power supply unit.

The vibration detecting unit 2 detects vibrations of the vehicle. The vibration detecting unit 2 includes, for example, an acceleration sensor. The vibration detecting unit 2 detects the acceleration produced in the vehicle and outputs information indicating the detected acceleration produced in the vehicle to the power supply controlling unit 4. In this example, it suffices that the vibration detecting unit 2 can detect vibrations of the vehicle, and the vibration detecting unit 2 may include a displacement sensor or the like.

The ON/OFF detecting unit 3 detects a switch between ON and OFF of an accessory power of the vehicle. The ON/OFF detecting unit 3 outputs, to the power supply controlling unit 4, information indicating the result from detecting a switch between ON and OFF of the accessory power of the vehicle.

While more elaborate description will be provided later, the power supply controlling unit 4 controls the second power supply unit 11 and thus controls the power supplied to the orientation detecting unit 5, the GPS receiving unit 6, the storing unit 7, the processing unit 8, and the display unit 9. The power supply controlling unit 4 also calculates a vibration value of the vehicle based on the acceleration produced in the vehicle as indicated by information input from the vibration detecting unit 2.

To be more specific, when the accessory power of the vehicle is ON, the power supply controlling unit 4 controls the second power supply unit 11 and supplies power to the orientation detecting unit 5, the GPS receiving unit 6, the storing unit 7, the processing unit 8, and the display unit 9, so that the processing device 1 functions as a navigation system.

Meanwhile, while more elaborate description will be provided later, when the accessory power of the vehicle is OFF, the power supply controlling unit 4 controls the second power supply unit 11 and turns off the power supplied to the GPS receiving unit 6 and the display unit 9. Moreover, based on the calculated vibration value of the vehicle, the power supply controlling unit 4 controls the second power supply unit 11 and controls the power supplied to the orientation detecting unit 5, the storing unit 7, and the processing unit 8.

The orientation detecting unit 5 detects the orientation of the vehicle. The orientation detecting unit 5 includes, for example, a gyro sensor. The orientation detecting unit 5 detects the rotational angular velocity of the vehicle that rotates about an axis extending in the up-down direction of the vehicle and, and the orientation detecting unit 5 outputs information indicating the detected rotational angular velocity of the vehicle to the processing unit 8. It suffices that the orientation detecting unit 5 include a typically used inertial sensor that can detect the rotational angular velocity.

The GPS receiving unit 6 receives position information of the vehicle from GPS satellites and outputs the received position information to the processing unit 8. Whereas the processing device 1 according to the present embodiment includes the GPS receiving unit 6, the processing device 1 may instead include a position information receiving unit that can receive position information of the vehicle from other satellite positioning systems, such as Global Navigation Satellite System (GLONASS) or Quasi-Zenith Satellite System known as Nichibiki. In short, it suffices that the processing device 1 be capable of acquiring position information of the vehicle from the outside. The storing unit 7 has a map DB (database) prestored therein. Moreover, the storing unit 7 has stored therein, for example, information indicating the orientation of the vehicle calculated by the processing unit 8 as described later.

The processing unit 8 calculates the orientation of the vehicle based on the rotational angular velocity of the vehicle indicated by information input from the orientation detecting unit 5 and outputs information indicating the calculated orientation of the vehicle to the storing unit 7. Moreover, while more elaborate description will be provided later, the processing unit 8 performs map matching based on the map DB read out from the storing unit 7, the orientation of the vehicle indicated by information read out from the storing unit 7, and the position of the vehicle indicated by information input from the GPS receiving unit 6. Thus, the processing unit 8 generates a navigation image to be displayed on the display unit 9.

The display unit 9 displays a navigation image. The display unit 9 includes, for example, a liquid-crystal display panel and a touch panel laminated on the liquid-crystal display panel. A user can carry out various operations on the navigation system by touching the display unit 9. The display unit 9 may instead include an organic electroluminescence (EL) panel, for example, and it suffices that the display unit 9 be capable of displaying at least a navigation image.

Figure 2:
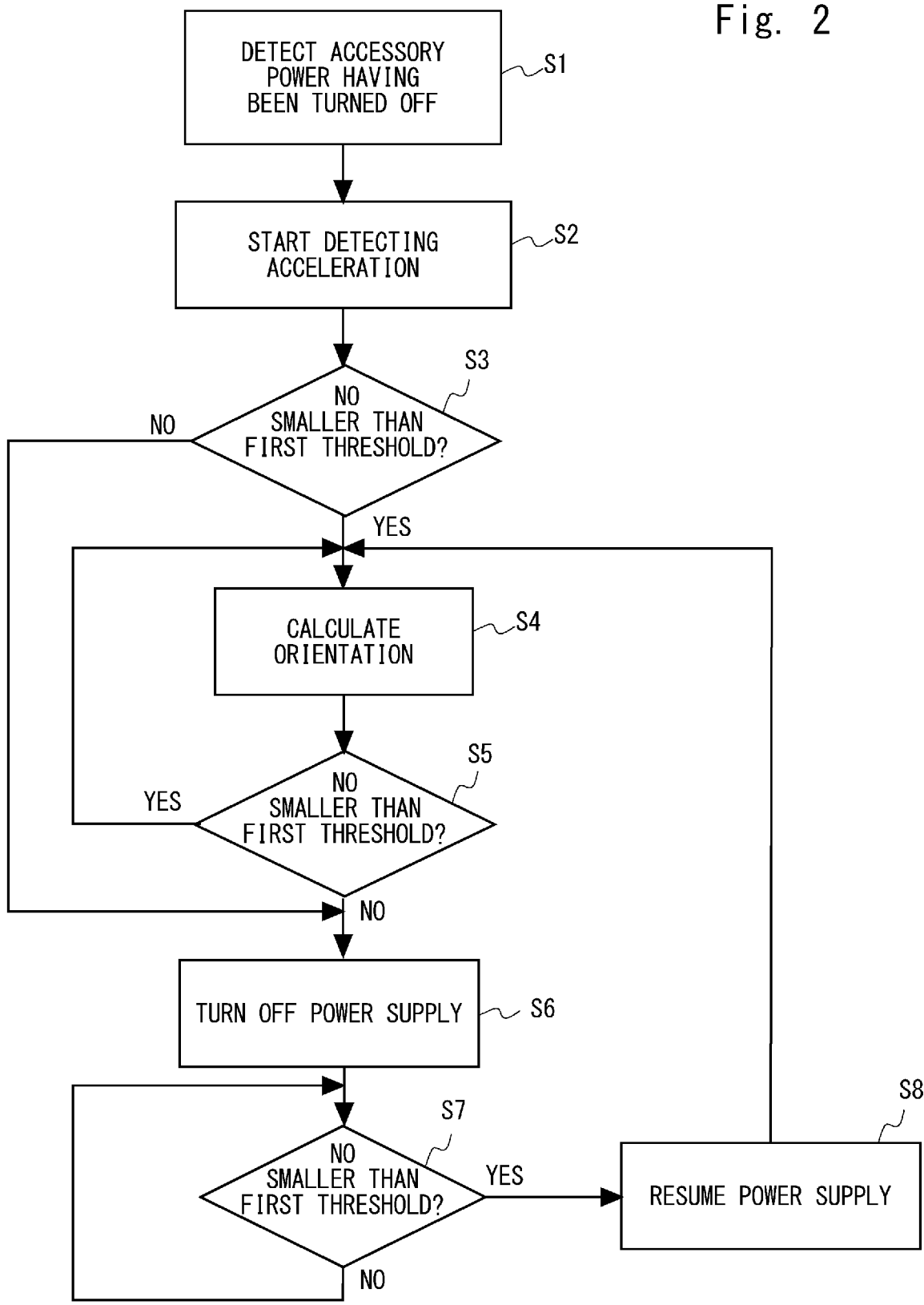
FIG. 2 illustrates a flow of an operation of the processing device according to the first embodiment.

Next, an operation of the processing device 1 according to the present embodiment will be described. FIG. 2 illustrates a flow of an operation of the processing device according to the present embodiment. The following section describes an operation of the processing device 1 performed after the vehicle has entered a multilevel parking garage where the orientation of the vehicle is to change and after the accessory power has been turned OFF.

First, upon the user turning OFF the accessory power of the vehicle, the ON/OFF detecting unit 3 detects the accessory power having been turned OFF and outputs information indicating the result of the detection to the power supply controlling unit 4 (S1). At this point, the vibration detecting unit 2, the ON/OFF detecting unit 3, and the power supply controlling unit 4 continue to receive power from the first power supply unit 10.

In other words, even after the accessory power of the vehicle has been turned OFF, the vibration detecting unit 2 continues to detect vibrations of the vehicle, and the ON/OFF detecting unit 3 continues to detect any switch between ON and OFF of the accessory power.

Based on the result of the detection indicated by the information input from the ON/OFF detecting unit 3, the power supply controlling unit 4 controls the second power supply unit 11 and turns off the power supplied to the GPS receiving unit 6 and the display unit 9. Meanwhile, the power supply controlling unit 4 controls the second power supply unit 11 and continues to supply power to the orientation detecting unit 5, the storing unit 7, and the processing unit 8.

Next, the vibration detecting unit 2 starts detecting the acceleration produced in the vehicle and outputs information indicating the detected acceleration produced in the vehicle to the power supply controlling unit 4 (S2). Based on the acceleration produced in the vehicle indicated by the information input from the vibration detecting unit 2, the power supply controlling unit 4 calculates the vibration value of the vehicle and determines whether the power supply controlling unit 4 has obtained a calculated vibration value that is not smaller than a preset first threshold within a preset first period (S3).

In this example, the first period can be set as appropriate in accordance with the period from when the vehicle is placed on a turntable in a multilevel parking garage to when the turntable starts rotating. The first period may be set to about two minutes. The first threshold can be set to a vibration value of vibrations propagated to the vehicle when the turntable rotates, for example. The first period and the first threshold can each be set as appropriate.

If the power supply controlling unit 4 has obtained a calculated vibration value that is not smaller than the first threshold within the first period after the accessory power of the vehicle has been turned OFF (YES at S3), the power supply controlling unit 4 controls the second power supply unit 11 and continues to supply power to the orientation detecting unit 5, the storing unit 7, and the processing unit 8.

Next, the processing unit 8 calculates the orientation of the vehicle (S4). To be more specific, the orientation detecting unit 5 outputs information indicating the detected rotational angular velocity of the vehicle to the processing unit 8. Based on the rotational angular velocity of the vehicle indicated by the information input from the orientation detecting unit 5, the processing unit 8 calculates the current orientation of the vehicle and outputs information indicating the calculated current orientation of the vehicle to the storing unit 7.

Next, the power supply controlling unit 4 determines whether the power supply controlling unit 4 has obtained a calculated vibration value that is not smaller than the first threshold again within the first period starting from when the previously calculated vibration value of the vehicle has fallen below the first threshold (S5). If the power supply controlling unit 4 has obtained a calculated vibration value that is not smaller than the first threshold (YES at S5), the power supply controlling unit 4 continues to supply power to the orientation detecting unit 5, the storing unit 7, and the processing unit 8 and executes the process at S4.

Meanwhile, if the power supply controlling unit 4 does not obtain a calculated vibration value that is not smaller than the first threshold again within the first period starting from when the previously calculated vibration value has fallen below the first threshold (NO at S5), the power supply controlling unit 4 controls the second power supply unit 11 and turns off the power supplied to the orientation detecting unit 5, the storing unit 7, and the processing unit 8 (S6).

While the power supply controlling unit 4 does not obtain any calculated vibration value that is not smaller than the first threshold, the power supply controlling unit 4 continues to calculate the vibration value of the vehicle based on the acceleration produced in the vehicle indicated by information input from the vibration detecting unit 2 and continues to determine whether each calculated vibration value is not smaller than the first threshold (S7). If there is a calculated vibration value of the vehicle that is not smaller than the first threshold (YES at S7), the power supply controlling unit 4 controls the second power supply unit 11, resumes the power supplied to the orientation detecting unit 5, the storing unit 7, and the processing unit 8 (S8), and returns to the process at S4.

Meanwhile, if a calculated vibration value of the vehicle is smaller than the first threshold (NO at S7), the power supply controlling unit 4 controls the second power supply unit 11, continues to turn off the power supplied to the orientation detecting unit 5, the storing unit 7, and the processing unit 8, and returns to the process at S7. If the power supply controlling unit 4 does not obtain a calculated vibration value that is not smaller than the first threshold within the first period after the accessory power of the vehicle has been turned OFF (NO at S3), the power supply controlling unit 4 executes the process at S6.

When the accessory power is turned ON by the user at any timing after the accessory power of the vehicle has been turned OFF, the ON/OFF detecting unit 3 detects the accessory power having been turned ON and outputs information indicating the result of the detection to the power supply controlling unit 4. Then, the power supply controlling unit 4 controls the second power supply unit 11 and supplies power to the orientation detecting unit 5, the GPS receiving unit 6, the storing unit 7, the processing unit 8, and the display unit 9. The processing unit 8 reads out the map DB and information indicating the latest orientation of the vehicle from the storing unit 7 and performs map matching based on the map DB, the latest orientation of the vehicle, and the position of the vehicle indicated by information input from the GPS receiving unit 6. Thus, the processing unit 8 generates a navigation image and displays the navigation image on the display unit 9.

Figure 3:
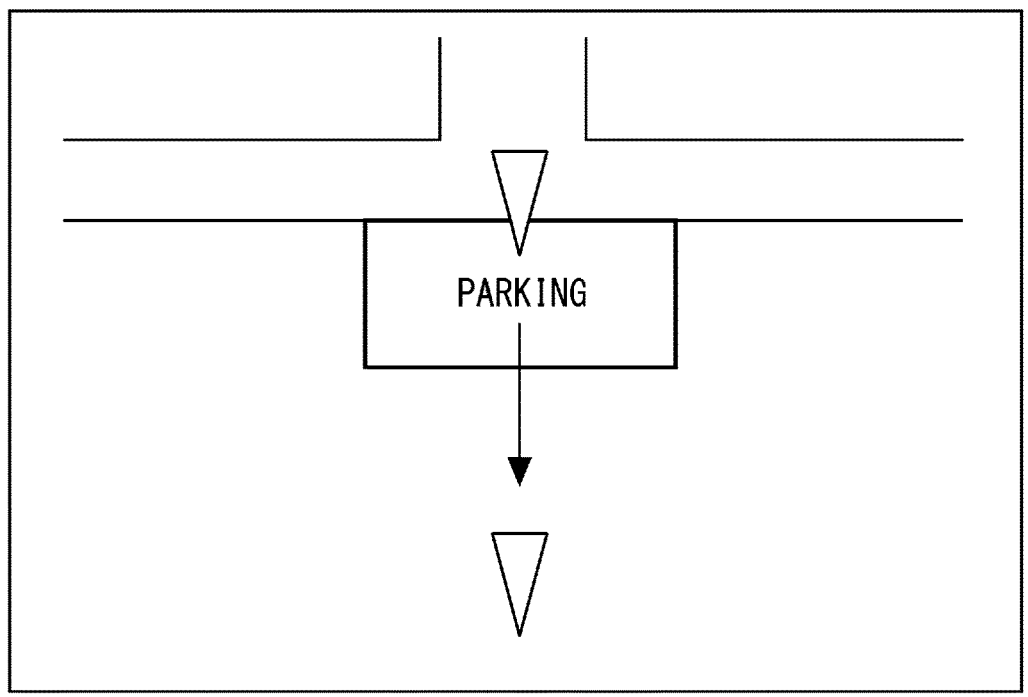
FIG. 3 illustrates a navigation image to be generated when an accessory power is switched from OFF to ON as a vehicle provided with a navigation system that is not equipped with a function of correcting the orientation of the vehicle exits a multilevel parking garage.
Figure 4:
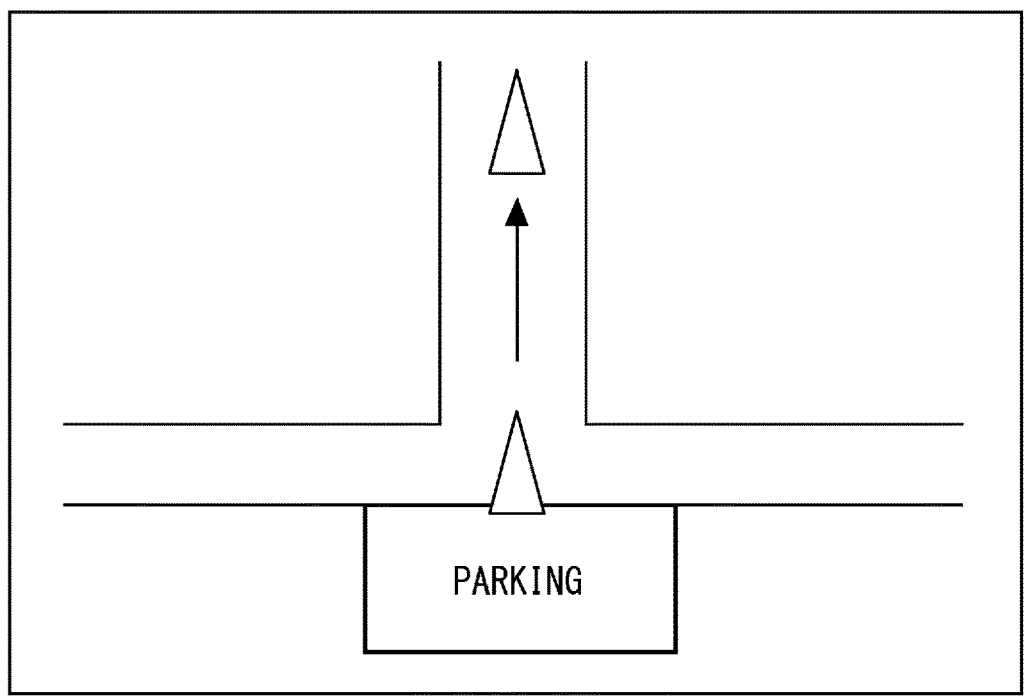
FIG. 4 illustrates a navigation image to be generated when an accessory power is switched from OFF to ON as a vehicle provided with the processing device according to the first embodiment exits a multilevel parking garage.

FIG. 3 illustrates a navigation image to be generated when an accessory power is switched from OFF to ON as a vehicle provided with a navigation system that is not equipped with the function of correcting the orientation of the vehicle exits a multilevel parking garage. FIG. 4 illustrates a navigation image to be generated when the accessory power is switched from OFF to ON as the vehicle provided with the processing device according to the present embodiment exits a multilevel parking garage. In FIGS. 3 and 4, the triangles represent the vehicles.

As illustrated in FIG. 3, in the vehicle provided with the navigation system that is not equipped with the function of correcting the orientation of the vehicle, the orientation of the vehicle on the map in the navigation image is unchanged from the orientation held when the vehicle has entered the multilevel parking garage. Even if the orientation of the vehicle has changed in the multilevel parking garage, the orientation of the vehicle on the map cannot be corrected promptly. In contrast, with the processing device 1 according to the present embodiment, the latest orientation of the vehicle is being acquired as described above even while the accessory power is OFF. Therefore, as illustrated in FIG. 4, if the orientation of the vehicle has changed in the multilevel parking garage, the orientation of the vehicle on the map in the navigation image can be corrected promptly.

Furthermore, with the processing device 1 according to the present embodiment, the processing device 1 itself automatically corrects the orientation of the vehicle on the map. Therefore, the user does not need to input direction correcting information for correcting the orientation of the vehicle on the map, and this allows the orientation of the vehicle on the map to be corrected with ease.

With the processing device 1 according to the present embodiment, the power supply controlling unit 4 cuts off the power supplied to the orientation detecting unit 5, the storing unit 7, and the processing unit 8 if the power supply controlling unit 4 does not obtain any calculated vibration value of the vehicle that is not smaller than the first threshold after the accessory power of the vehicle has been turned OFF. This configuration, therefore, can contribute to reducing the power consumption of the second power supply unit 11.

With the processing device 1 according to the present embodiment, map matching is performed by use of position information of the vehicle received by the GPS receiving unit 6. Therefore, even in a case where the vehicle is transported by a transport truck or the like and the orientation and the position of the vehicle differ between before and after the transport, for example, map matching can be performed promptly.

Moreover, with the processing device 1 according to the present embodiment, the power continues to be supplied to the orientation detecting unit 5, the storing unit 7, and the processing unit 8 if vibrations of the vehicle that are not smaller than the first threshold are detected within the first period. This configuration allows the orientation detecting unit 5, the storing unit 7, and the processing unit 8 to operate properly until the turntable starts rotating after the vehicle has entered the multilevel parking garage, for example.

Second Embodiment

Figure 5:
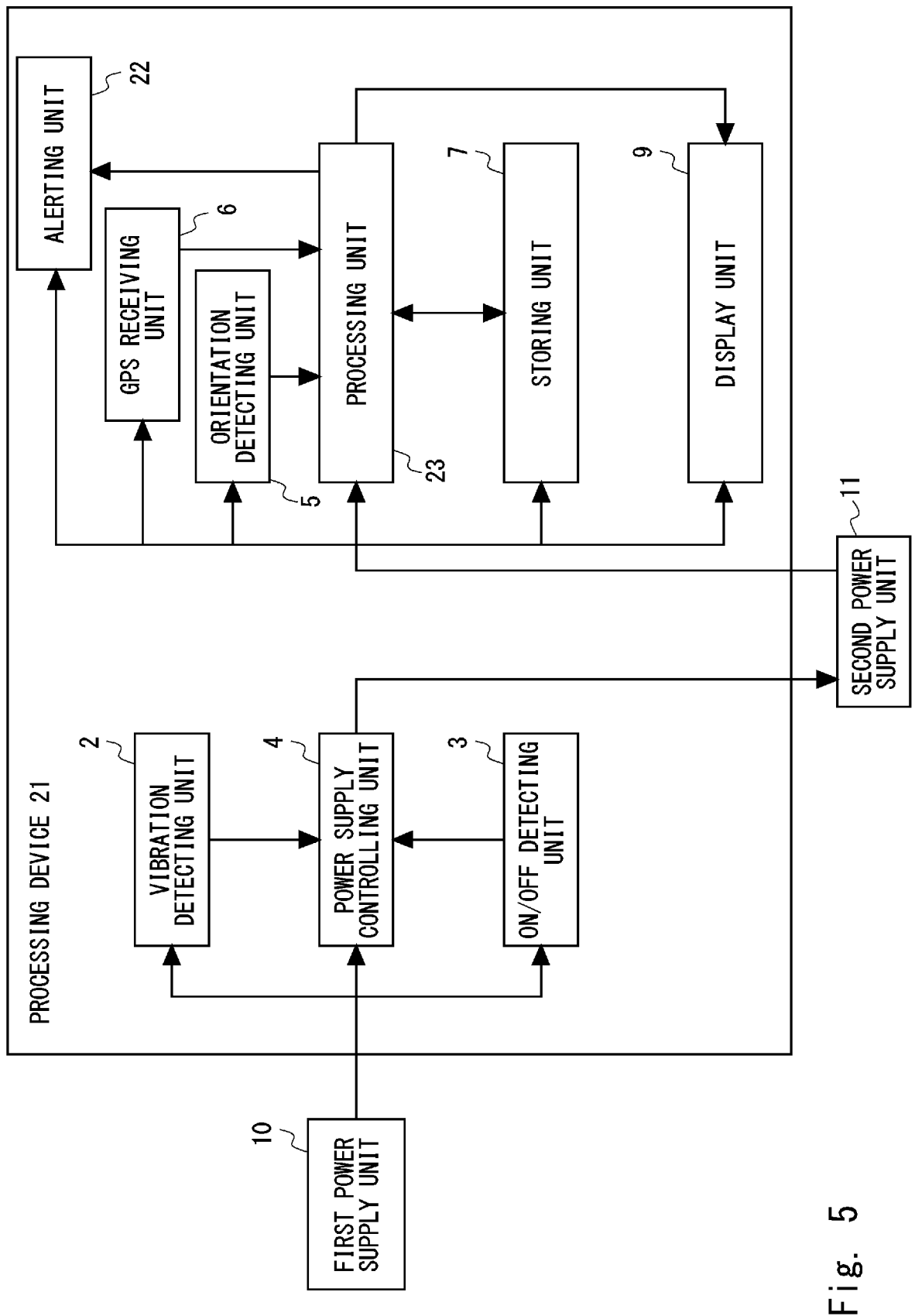
FIG. 5 is a block diagram illustrating a configuration of a processing device according to a second embodiment.

FIG. 5 is a block diagram illustrating a configuration of a processing device according to the present embodiment. In the following description, any description repetitive of the description of the first embodiment will be omitted, and equivalent elements are given identical reference characters.

Whereas the configuration of a processing device 21 according to the present embodiment is substantially identical to the configuration of the processing device 1 according to the first embodiment, the processing device 21 further includes an alerting unit 22 for alerting the user when the orientation of the vehicle on the map in a navigation image has been corrected.

The alerting unit 22 includes, for example, a loudspeaker and is supplied with power from the second power supply unit 11. The alerting unit 22 is controlled by a processing unit 23. To be more specific, when the accessory power of the vehicle is switched from OFF to ON, the processing unit 23 reads out, from the storing unit 7, information indicating the orientation of the vehicle held immediately before the accessory power has been switched from ON to OFF and information indicating the orientation of the vehicle held immediately after the accessory power has been switched from OFF to ON. If these pieces of information indicate different orientations of the vehicle, the processing unit 23 controls the alerting unit 22 to cause the alerting unit 22 to provide audible output stating, for example, "please notice that the orientation of the vehicle has been corrected."

This allows the user of the vehicle to recognize that the orientation of the vehicle on the map in the navigation image has been corrected when the orientation of the vehicle held when the vehicle exits a multilevel parking garage differs from the orientation held when the vehicle has entered the multilevel parking garage, for example. According to the present embodiment, the user is alerted audibly. Alternatively, alert information may be displayed on the display unit 9. In short, it suffices that the alerting unit 22 be capable of alerting the user when the orientation of the vehicle on the map in the navigation image has been corrected.

Third Embodiment

Typically, facilities, such as a multilevel parking garage, where the orientation of vehicles may change are often dim, closed spaces. Therefore, a processing device according to the present embodiment is configured to activate the above-described function of correcting the orientation of a vehicle only in a case where the inside or the surroundings of the vehicle are dim.

Figure 6:
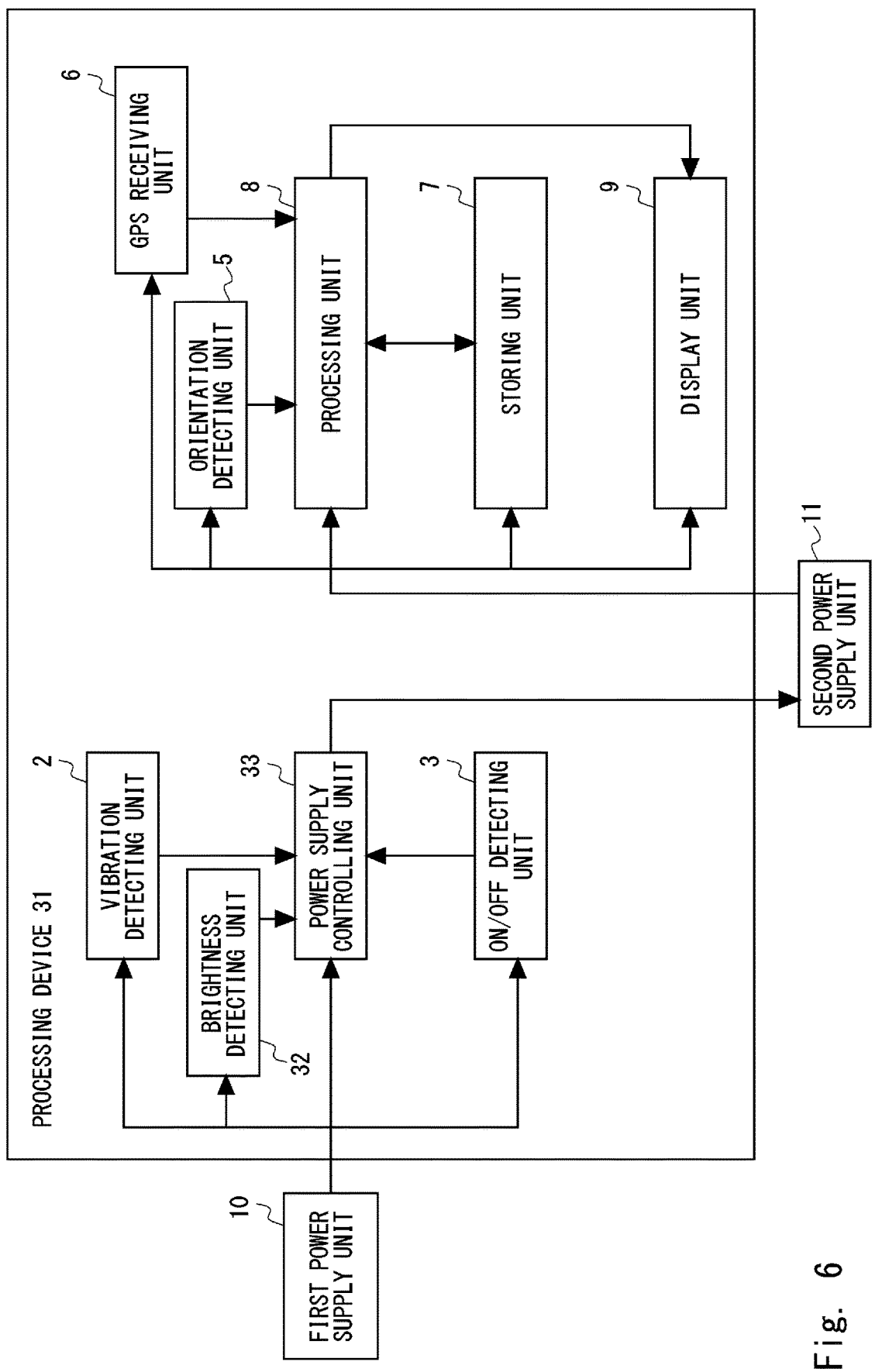
FIG. 6 is a block diagram illustrating a configuration of a processing device according to a third embodiment.

FIG. 6 is a block diagram illustrating a configuration of the processing device according to the present embodiment. In the following description, any description repetitive of the description of the first embodiment and so on will be omitted, and equivalent elements are given identical reference characters.

Whereas the configuration of a processing device 31 according to the present embodiment is substantially identical to the configuration of the processing device 1 according to the first embodiment, the processing device 31 further includes a brightness detecting unit 32 that detects the brightness of the inside or the surroundings of the vehicle. The brightness detecting unit 32 includes a light-receiving sensor that receives light in the inside or the surroundings of the vehicle. The brightness detecting unit 32 outputs information indicating a current value obtained upon photoelectric conversion to a power supply controlling unit 33. Such a brightness detecting unit 32 operates on the power supplied from the first power supply unit 10.

The power supply controlling unit 33 determines whether the current value indicated by information input from the brightness detecting unit 32 is not smaller than a preset second threshold. If this current value is not smaller than the second threshold, the power supply controlling unit 33 turns off the power supplied to the orientation detecting unit 5, the storing unit 7, and the processing unit 8 even if the vibration value of vibrations propagated to the vehicle while the accessory power is OFF is not smaller than the first threshold.

In other words, the power supply controlling unit 33 supplies power to the orientation detecting unit 5, the storing unit 7, and the processing unit 8 if the inside of a multilevel parking garage or the like is dim and the current value indicated by information input from the brightness detecting unit 32 is smaller than the second threshold and if vibrations of a vibration value that is not smaller than the first threshold are propagated to the vehicle while the accessory power is OFF.

In this example, the second threshold can be set to a current value held when the brightness detecting unit 32 has detected the brightness of the inside of a typical multilevel parking garage, for example, or can be set as appropriate.

With the above configuration, the function of correcting the orientation of a vehicle described above can be activated only in a case where the vehicle has entered a facility, such as a multilevel parking garage, where the orientation of the vehicle may change, and this can keep the power from being supplied to the orientation detecting unit 5, the storing unit 7, and the processing unit 8 in response to propagation of vibrations other than the vibrations resulting from the change in the orientation of the vehicle caused by a turntable or the like. Therefore, the above configuration can contribute to reducing the power consumption.

In a multilevel parking garage serving as a representative example of facilities where the orientation of a vehicle may change, typically, a vehicle is moved up or down after entering the garage. Therefore, the vibration detecting unit 2 according to the present embodiment may be configured to detect only the vibrations of a vehicle in the up-down direction. This can more reliably keep the power from being supplied to the orientation detecting unit 5, the storing unit 7, and the processing unit 8 in response to propagation of vibrations other than the vibrations resulting from the change in the orientation of the vehicle caused by a turntable or the like.

The present invention is not limited to the foregoing embodiments, and modifications can be made as appropriate within the scope that does not depart from the spirit of the present invention.

For example, in the processing devices according to the foregoing embodiments, the first power supply unit 10 and the second power supply unit 11 are separate components. Alternatively, the first power supply unit 10 and the second power supply unit 11 may be configured as a single power supply unit.

For example, the processing devices according to the foregoing embodiments are each configured as a navigation system and each include the vibration detecting unit 2, the GPS receiving unit 6, and the display unit 9. Alternatively, it suffices that the vibration detecting unit 2, the GPS receiving unit 6, and the display unit 9 be provided at least in a vehicle. The processing devices according to the foregoing embodiments are each configured as a navigation system. Alternatively, the processing devices may be configured as a correcting device that corrects the orientation of the vehicle on a map of a navigation system.

According to the foregoing embodiments, the present invention has been described as a configuration of hardware, but the present invention is not limited thereto. According to the present invention, any desired process or processes can be implemented as a central processing unit (CPU) executes a computer program.

Such a program can be stored by use of various types of non-transitory computer-readable media and supplied to a computer. The non-transitory computer-readable media include various types of tangible storage media. Examples of the non-transitory computer-readable media include a magnetic storage medium (e.g., a flexible disk, a magnetic tape, a hard-disk drive), a magneto-optical storage medium (e.g., a magneto-optical disk), a CD-ROM (read-only memory), a CD-R, a CD-R/W, and a semiconductor memory (e.g., a mask ROM, a programmable ROM (PROM), an erasable PROM (EPROM), a flash ROM, a random-access memory (RAM)). Moreover, the program may be supplied to a computer by use of various types of transitory computer-readable media. Examples of the transitory computer-readable media include an electric signal, an optical signal, and an electromagnetic wave. The transitory computer-readable media can supply the program to a computer via a wired communication line, such as an electric wire or an optical fiber, or via a wireless communication line.

What is claimed is:

1. A processing device comprising:
   a vibration detecting unit configured to detect a vibration of a vehicle;
   an orientation detecting unit configured to detect an orientation of the vehicle;
   a storing unit configured to store information indicating the orientation of the vehicle;
   a processing unit configured to set an orientation of the vehicle on a map of a navigation system based on the information indicating the orientation of the vehicle;
   a power supply controlling unit configured to control power supplied to the orientation detecting unit and the storing unit based on a detection result of the vibration detecting unit and in response to an accessory power of the vehicle turned OFF, wherein the power supply controlling unit is configured to:
   continue to supply the power to the vibration detecting unit when the accessory power of the vehicle is turned OFF;
   supply the power to the orientation detecting unit and the storing unit when the vibration detecting unit detects a vibration that is not smaller than a preset first threshold;
   cause the orientation detecting unit to detect the orientation of the vehicle;
   cause the storing unit to store information indicating the detected orientation of the vehicle; and
   turn off the power supplied to the orientation detecting unit and the storing unit when the vibration detecting unit does not detect any vibration that is not smaller than the first threshold;
   and a brightness detecting unit configured to detect brightness of an inside or surroundings of the vehicle, wherein, when the brightness of the inside or the surroundings of the vehicle detected by the brightness detecting unit is not lower than a preset second threshold, the power supply controlling unit turns off the power supplied to the orientation detecting unit and the storing unit when the vibration detecting unit has detected the vibration that is not smaller than the first threshold while the accessory power of the vehicle is OFF.

2. The processing device according to claim 1, further comprising an alerting unit configured to alert a user of the vehicle,
   wherein the processing unit is configured to
      compare an orientation of the vehicle immediately before the accessory power of the vehicle has been turned OFF and an orientation of the vehicle immediately after the accessory power of the vehicle has been turned ON, and
      inform the user, by controlling the alerting unit, that the orientation of the vehicle has been corrected when a comparison result indicates that the orientations differ from each other.

3. The processing device according to claim 1, further comprising a position information receiving unit configured to receive position information of the vehicle,
wherein in response to the accessory power of the vehicle being turned ON, the processing unit performs map matching on the map of the navigation system based on the position information of the vehicle received by the position information receiving unit and information indicating a latest orientation of the vehicle.

4. The processing device according to claim 1, wherein the vibration detecting unit is configured to detect a vibration of the vehicle in an up-down direction.

5. The processing device according to claim 1, wherein the power supply controlling unit is configured to turn off the power supplied to the orientation detecting unit and the storing unit when a preset period has passed since the vibration detected by the vibration detecting unit fell below the first threshold.

6. A processing method comprising:
continuing to supply power to a vibration detecting unit configured to detect a vibration of a vehicle, when an accessory power of the vehicle is turned OFF;
when the vibration detecting unit has detected a vibration that is not smaller than a preset first threshold while the accessory power of the vehicle is OFF, supplying power to an orientation detecting unit configured to detect an orientation of the vehicle and to a storing unit configured to store information indicating the orientation of the vehicle, detecting the orientation of the vehicle by the orientation detecting unit, and storing information indicating the detected orientation of the vehicle by the storing unit;
turning off the power supplied to the orientation detecting unit and the storing unit when the vibration detecting unit does not detect any vibration that is not smaller than the first threshold while the accessory power of the vehicle is OFF;
setting an orientation of a vehicle on a map of a navigation system based on information indicating a latest orientation of the vehicle; and
detecting brightness of an inside or surroundings of the vehicle, wherein, when the brightness of the inside or the surroundings of the vehicle is not lower than a preset second threshold, the power supplied to the orientation detecting unit is turned off and the storing unit when the vibration detecting unit has detected the vibration that is not smaller than the first threshold while the accessory power of the vehicle is OFF.

7. A non-transitory computer-readable recording medium storing a program that causes a computer to execute:
continuing to supply power to a vibration detecting unit configured to detect a vibration of a vehicle, when an accessory power of the vehicle is turned OFF;
when the vibration detecting unit has detected a vibration that is not smaller than a preset first threshold while the accessory power of the vehicle is OFF, supplying power to an orientation detecting unit configured to detect an orientation of the vehicle and to a storing unit configured to store information indicating the orientation of the vehicle, detecting the orientation of the vehicle by the orientation detecting unit, and storing information indicating the detected orientation of the vehicle by the storing unit;
turning off the power supplied to the orientation detecting unit and the storing unit when the vibration detecting unit does not detect any vibration that is not smaller than the first threshold while the accessory power of the vehicle is OFF;
a process of setting an orientation of a vehicle on a map of a navigation system based on information indicating a latest orientation of the vehicle; and
detecting brightness of an inside or surroundings of the vehicle, wherein, when the brightness of the inside or the surroundings of the vehicle is not lower than a preset second threshold, the power supplied to the orientation detecting unit is turned off and the storing unit when the vibration detecting unit has detected the vibration that is not smaller than the first threshold while the accessory power of the vehicle is OFF.

* * * * *